US008118193B2

(12) United States Patent
Law

(10) Patent No.: US 8,118,193 B2
(45) Date of Patent: Feb. 21, 2012

(54) DISPENSERS E.G. FOR COSMETICS

(75) Inventor: Brian Law, Leicester (GB)

(73) Assignee: Rieke Corporation, Auburn, IN (US)

( * ) Notice: Subject to any disclaimer, the term of this patent is extended or adjusted under 35 U.S.C. 154(b) by 699 days.

(21) Appl. No.: 12/279,624

(22) PCT Filed: Feb. 20, 2007

(86) PCT No.: PCT/GB2007/000582
§ 371 (c)(1),
(2), (4) Date: Dec. 1, 2008

(87) PCT Pub. No.: WO2007/096599
PCT Pub. Date: Aug. 30, 2007

(65) Prior Publication Data
US 2009/0218008 A1 Sep. 3, 2009

(30) Foreign Application Priority Data
Feb. 20, 2006 (GB) .................................. 0603416.9

(51) Int. Cl.
*B67D 7/06* (2010.01)
*G01F 11/00* (2006.01)
*B65D 88/54* (2006.01)

(52) U.S. Cl. ....................................... 222/205; 222/256

(58) Field of Classification Search .................. 222/205, 222/207, 256, 339, 340, 321.6, 378, 380, 222/383.1, 108; 401/188 R; 132/298, 299, 132/74.5, 289, 290, 306, 307
See application file for complete search history.

(56) References Cited

U.S. PATENT DOCUMENTS 2,095,622 A * 10/1937 Wilson ....................... 222/321.6
2,500,687 A * 3/1950 Kamp et al. .................... 222/48
2,748,988 A * 6/1956 Fromson ....................... 222/207
3,263,871 A * 8/1966 Thompson .................... 222/205
4,548,524 A * 10/1985 Seager .......................... 401/187
(Continued)

FOREIGN PATENT DOCUMENTS

EP 282595 A1 * 9/1988
(Continued)

OTHER PUBLICATIONS

International Patent Application PCT/GB2007/000582 International Search Report mailed May 23, 2007.

(Continued)

*Primary Examiner* — Kevin P Shaver
*Assistant Examiner* — Nicholas Weiss
(74) *Attorney, Agent, or Firm* — Woodward, Emhardt, Moriarty, McNett & Henry LLP

(57) ABSTRACT

The application describes small hand-held dispensers suitable for use with creamy flowable products such as cosmetics. The dispensers are of a kind having a top plate (4) with a dished pick-up surface (42), and a product discharge opening (43) opening into the pick-up area (42). Specific proposals include positioning the pick-up surface (42) and an actuator (8) side-by-side on the top plate. The actuator (8) operates a pump (6), desirably positioned beneath the actuator and offset from the pick-up surface (42). A corresponding transverse outlet conduit (69) may be provided. The container (1) may be plastics or a metal container. Embodiments using plastic pump springs and resiliently deformable pump chamber walls are also described. Also, embodiments in which actuation is by tilting of the top plate in its entirety, the pick-up area then optionally being central.

19 Claims, 7 Drawing Sheets

U.S. PATENT DOCUMENTS

Figure 1A:
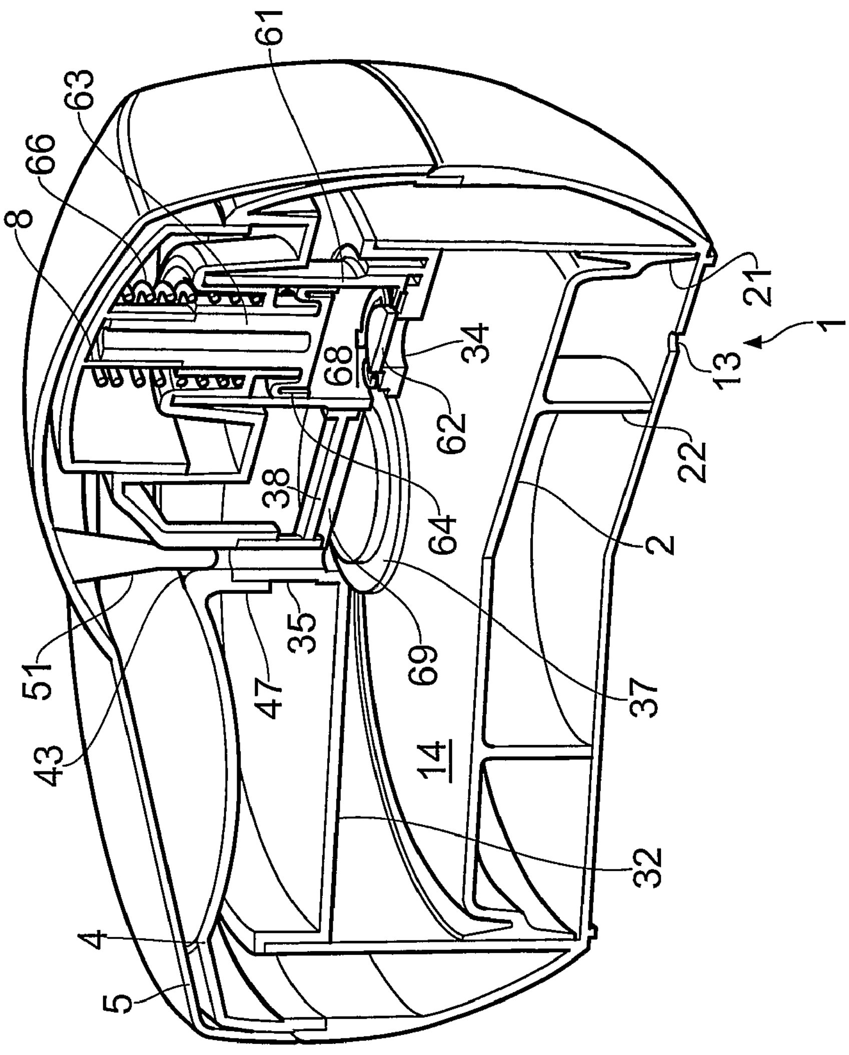

| | | | | |
|---|---|---|---|---|
| 4,565,306 | A * | 1/1986 | Nakanishi et al. | 222/207 |
| 4,762,475 | A * | 8/1988 | Fuchs | 417/550 |
| 4,795,063 | A * | 1/1989 | Sekiguchi et al. | 222/105 |
| 4,872,596 | A * | 10/1989 | Corsette | 222/380 |
| 4,890,773 | A * | 1/1990 | Corsette | 222/380 |
| 4,892,231 | A * | 1/1990 | Ball | 222/207 |
| 4,913,322 | A * | 4/1990 | Stoffler et al. | 222/207 |
| 4,946,076 | A * | 8/1990 | Hackmann et al. | 222/207 |
| 4,991,744 | A * | 2/1991 | Von Schuckmann | 222/136 |
| 5,052,592 | A * | 10/1991 | Wilken et al. | 222/212 |
| 5,178,300 | A * | 1/1993 | Haviv et al. | 222/95 |
| 5,454,488 | A * | 10/1995 | Geier | 222/95 |
| 6,460,739 | B1 * | 10/2002 | Norris et al. | 222/380 |
| 6,763,978 | B2 * | 7/2004 | Pritchett et al. | 222/321.7 |
| 7,264,142 | B2 * | 9/2007 | Py | 222/321.7 |
| 7,578,417 | B2 * | 8/2009 | Son | 222/257 |
| 7,644,842 | B2 * | 1/2010 | Py | 222/321.7 |
| 7,886,937 | B2 * | 2/2011 | Py | 222/321.7 |
| 2005/0115984 | A1 * | 6/2005 | Pritchett et al. | 222/95 |
| 2008/0169312 | A1 * | 7/2008 | Kee | 222/205 |
| 2009/0166383 | A1 * | 7/2009 | Canfield | 222/207 |
| 2009/0179048 | A1 * | 7/2009 | Decottignies et al. | 222/205 |
| 2009/0283548 | A1 * | 11/2009 | Hummel | 222/321.7 |

FOREIGN PATENT DOCUMENTS

| | | | |
|---|---|---|---|
| EP | 0 363 307 | A1 | 4/1990 |
| GB | 2 184 493 | A | 6/1987 |
| GB | 0 810 160 | A | 12/1997 |
| WO | WO 2005/087618 | A1 | 9/2005 |

OTHER PUBLICATIONS

Machine translation of EP 0 363 307 A1.

* cited by examiner

DISPENSERS E.G. FOR COSMETICS

This application is the National Stage of International Application No. PCT/GB2007/000582, filed Feb. 20, 2007, which claims the benefit of United Kingdom Application No. GB 0603416.9, filed Feb. 20, 2006, the entire disclosures of which are hereby incorporated by reference.

This application has to do with hand-operated dispensers. Preferred embodiments are dispensers which. with their container are of a size which can be held in the hand, and which contain or are intended to contain thick, viscous or creamy flowable products, especially cosmetics, skin treatments, ointments, lotions and the like.

BACKGROUND

There is a known kind of cosmetics dispenser, for a creamy product, consisting of a squat cylindrical jar to hold the product, with a dispensing top in the form of a circular plate with a dished central region having a small hole in the middle. The top plate as a whole can be pushed down with the fingers through a short pumping stroke, displacing a small volume of cream up through the central hole. The user can then pick up the dispensed product with a wiping action of the finger across the centre of the dished pick-up surface. Such a pick-up surface has an advantage (relative to a conventional nozzle or spout) that all or part of the dispensed amount can be picked up, and picked up without urgency because it lies stably on the surface rather than dropping off or running down as it would from a nozzle. This is particularly desirable with products dispensed in small-volume doses, say 1 ml or smaller, and which may contain high-value ingredients which the user will want to pick-up and apply with care and without waste.

Our new proposals relate to dispensers having a dished pick-up surface of this general kind.

OUR PROPOSALS: GENERAL

Generally speaking, our proposals relate to dispensers comprising a container, with an internal reservoir to hold a body of product. It is strongly preferred that the container be adapted for "airless" dispensing, i.e. it reduces its internal volume as product is progressively dispensed, e.g. by means of a collapsible liner or a follower piston (both of these being known technologies), so that product yet to be dispensed is not exposed to air in the container.

A dispenser mechanism is mounted at the top of the container. Normally the dispenser mechanism and container are discrete components and the dispenser mechanism, incorporated in a body, is fixed over a top opening or neck of the container. In preferred embodiments the container can stand freely on its own base surface and support the dispenser body on top. For convenience the following description assumes that the container opening is directed vertically upwardly and that the dispenser mechanism is on top, but it should be understood that concepts described herein are applicable for use in other orientations. Indeed, preferred embodiments described in this application are specifically adapted for use held in the hand without any specific orientation, although normally the pick-up surface will be directed generally upwardly in use.

As mentioned previously, the dispenser body incorporating the dispenser mechanism also features an external pick-up surface, being a surface adapted and positioned for pick-up of product, in the manner described above, from adjacent a discharge opening from a pump outlet. The discharge opening opens through the pick-up surface and is typically flush with it, so that no nozzle obstructs the wiping pick-up action. Typically the pick-up surface is present as an indentation, depression, localised region of concavity (in at least one and preferably two planes), or at least of lesser convexity. Conveniently it may be called "dished". It may have a surrounding rim or edge demarcating it from adjacent regions of the dispenser body which are typically flat or (more) outwardly convex. The provision of a wipeable dished pick-up region around a discharge outlet is already known, as mentioned above, so this feature is readily understood.

The dispensing mechanism includes, in general terms, a displaceable actuating member which is manually movable in a dispensing stroke to drive a dose of product from the discharge opening. Desirably, to assure a positive pumping action, the mechanism includes a pump chamber separated from the main body of product by an inlet with a unidirectional inlet valve. Reduction of the pump chamber volume by actuation (particularly, depression) of the actuating member drives the product out of the pump chamber to the discharge opening via an outlet passage. The outlet passage may or may not have an outlet valve, and this is discussed later in relation to some specific versions of our proposals. As is well-known, outlet valves normally operate so that when an actuating member returns from an actuated to a rest condition (usually under the influence of a pump return spring), the pump chamber is refilled with product (primed) from the product reservoir rather than drawing air in through the outlet. However there are situations in which some backflow through the outlet may be desirable (e.g. to clear the opening of product residues, and to avoid or reduce the drying out of product with consequent waste) and/or in which an outlet valve is unnecessary.

A variable-volume pump chamber may be provided in a piston and cylinder format, or as a chamber with a flexibly deformable wall.

The following particular proposals are made in the context of the above general description. To some extent they are consistent with one another, and may be adopted in any effective combination.

Our first specific proposal is that, in a dispenser of the kind described, the top of the dispenser body presents an upwardly-directed pick-up surface at one side and an upwardly-directed actuator portion (for the dispensing mechanism) at the other side. Preferably the actuating portion is movable by depression. It may be or comprise a movable component such as a button or plunger shaped and positioned for manual engagement.

This proposal is directed to achieving a new kind of ergonomic performance, specially directed at one-handed operation with the dispenser held in the hand, actuating by a thumb or finger of the hand which is holding the dispenser (in the palm or in the fingers).

Preferably the actuating portion for the dispenser stands higher than the pick-up surface, relative to the dispenser base. Thus, the dispenser body may present an upward surface which is generally inclined down from the actuating side to the pick-up side. The pick-up surface itself may be generally inclined, typically downwards away from the centre of the body and/or away from the actuator. (This is talking about a general inclination, e.g. as determined with reference to the locus of a rim or edge of the dished pick-up surface, rather than about the inclination of specific areas within the pick-up surface arising from its concavity.)

In preferred embodiments the pick-up surface occupies only a minor part of the horizontally-projected area of the top of the dispenser body (which is typically circular or oval in plan, as is desirably the dispenser as a whole: desirably the plan outline of the dispenser body substantially covers that of the container). The pick-up surface itself is desirably circular or oval in shape. It may occupy e.g. less than 60%, or less than 40%, or less than 25% of the upwardly-projected area of the dispenser body's top outline. In line with this, the dispenser body may present a top surface including the pick-up surface, centrally or towards one side, a surround surface region which serves to house and cover but is not pick-up surface, and an offset actuator part (which may be an opening for a discrete actuator such as a button or plunger) towards the other side. The pick-up surface may or may not overlap a central axis of the body. A surround surface region (as mentioned above) is preferably itself downwardly inclined towards the side having the pick-up surface.

The actuating portion may as mentioned be a discrete button or plunger, movable relative to the top element of the dispenser body. However it is also possible to use a tilting action of a top body plate, including the pick-up surface, for actuation. This would be distinct from the prior art mentioned above in that the top body plate is specifically restrained at one side, opposite the actuating portion, e.g. at a pivot point, while the side having the actuating portion is movable through the actuating stroke. This tilting top plate dispensing action is a second independent proposal, and can be used with a centrally-disposed pick-up surface. Where the engagement with a pump actuating mechanism is between the pivot and the actuating portion, e.g. central, it gives a mechanical advantage. [The first proposal contemplates in general that the actuating portion and the pick-up surface are laterally offset from one another, without strictly requiring that one or the other will be off-centre although in practice it is usually more compact to have them both off-centre at opposite sides.]

A third specific proposal herein—which can be adopted as one suitable way of implementing the first proposal—is that in a dispenser of the kind described having a pick-up surface and pump chamber, the pump chamber is laterally offset relative to the discharge outlet (which opens through the pick-up surface). Thus, the pump has a transversely-extending outlet passage between an outlet opening from the pump chamber and the discharge opening at the pick-up surface. Desirably the plunger action that operates the pump is vertical or at least substantially upright. The discharge opening is desirably eccentric on the pick-up surface, i.e. positioned towards the pump chamber so as to reduce the necessary length of outlet passage. Typically (seen in plan) in this proposal the outlet of the pump chamber is outside the plan projection of the pick-up surface area. At least the operating axis of the pump will usually be outside that area.

A transverse portion of such an outlet passage presents issues for moulding, since in general the dispenser is desirably made from moulded plastics components, and the presence of a transverse passage is contrary to the general need to withdraw mould parts in an axial direction so as to create the otherwise generally annular features, with vertical axis, which are conventionally characteristic of such dispensers. This issue can be addressed by forming the transverse outlet passage portion with an open side and closing this off in the assembly using a separate component to make a conduit. A preferred layout has an outlet opening laterally through the wall of the pump chamber, leading into the transverse passage, to an upright chimney portion of the outlet passage and to the discharge opening. This chimney portion can be created by cooperation of fitting tubular elements on opposed (upper and lower) dispenser body parts, since it is generally necessary to have separable body parts in order to create and house the pump mechanism.

In preferred embodiments (also in other aspects) the dispenser body has a lower body plate whose lower surface delimits the product reservoir, i.e. it constitutes a lid or cover for the product container. In this aspect it includes a downwardly-open inlet opening and an upwardly-open outlet chimney portion, laterally spaced from one another. A transversely-extending conduit portion, defined integrally in one piece with the body part, extends to the chimney portion. Adjacent the inlet opening, there may be an upwardly extending sleeve formation which constitutes a pump cylinder (to interact with a plunger or piston), or receives a discrete pump cylinder component, or constitutes a piston component in relation to a plunger acting as a cylinder. A cover component fits against the transverse conduit portion from beneath to complete and close off the conduit from the container space. A circular cover portion is preferred (e.g. so that it need not be aligned for assembly).

A fourth specific aspect of our proposals is, in a dispenser of the kind described having a pick-up surface and a pump with a pump chamber, that both the inlet and the outlet of the pump are at a base of the pump, formed through or in the fixed component(s) thereof. This contrasts with conventional dispensers, in which typically the discharge passage runs through the movable element (plunger or nozzle head) of the dispenser. This proposal is also consistent with the "transverse feed" proposal above, in which desirably the dispenser body elements having the pick-up surface and feed passage components are fixed relative to the container, with a discrete movable actuator for the pump being a simple button, i.e. not having an outlet through it.

A fifth particular proposal is a dispenser of the kind described, having a pick-up surface and a pump with a pump chamber, in which a resilient restoring force for the pump actuating member is provided by the pump chamber having a wall which is resiliently deformable, so that preferably no discrete spring is used. It is preferred to form the resiliently deformable wall as a moulded plastics component (as opposed to an elastomer component) by appropriate three-dimensional conformation of that wall. For example, an upwardly-directed wall may be divided circumferentially into a set of facets separated by reinforcing ribs or troughs, giving a specific rest position and a strong restoring force when bent away from the rest position. Because the operating stroke may then be rather short, it is preferred for the pump chamber to be wider than it is deep. This proposal can be combined with any other herein, or can be used in dispensers having a pick-up surface conventionally (e.g. centrally) disposed, and optionally with a known type of actuation e.g. in which depression of the entire top plate drives the dispensing action.

A sixth specific proposal, in a dispenser of the kind described having a pick-up surface and a pump chamber, is a manner of use of a moulded plastics component as a discrete restoring spring for the pump plunger. In this proposal, the plastics restoring spring has a mounting portion and one or more resiliently flexible limbs extending from the mounting portion. The or each limb engages a corresponding cam abutment, so that as the pump parts move relative to one another in the dispensing stroke (the spring may be mounted on the moving portion or on the fixed portion) the flexible limb rides past the cam abutment, flexing it progressively further relative to its mounting/rest position. The limb surface is inclined to the cam abutment so that its tendency to flex resiliently back towards its starting position drives an axial displacement between the two components, restoring the position of the plunger. Preferably plural limbs, distributed around the plunger, are used to give a symmetrical action and sufficient force. Plural limbs may be all made parts of a common spring element.

A seventh specific proposal herein is that, in a dispenser of the kind described having a pick-up surface and a dispenser body made of plastics material, incorporating a dispenser mechanism, the product container is a metal container, having a retaining neck or edge formation engaging the plastics dispenser body. Metal containers (e.g. aluminium) have particular utility with certain kinds of product ingredients which may be highly volatile or permeable with respect to plastics materials. In preferred embodiments the metal container incorporates an internal follower piston to give an "airless" operation as mentioned previously. On assembly, such a follower piston may be positioned in the container before an edge retaining formation is created on the container, i.e. while it still has a full-width opening. A typical retaining formation is an inturned portion. Preferred containers are pressed from sheet metal, e.g. impact extruded.

An eighth specific proposal relates to the discharge opening. In known dispensers having pick-up surfaces, the discharge opening is a simple opening. We propose to provide a valve at the discharge opening, so that air entry into the outlet passage is prevented or restricted. Preferably the valve is biased to the closed position by one or more resilient biasing elements. The biasing element(s) is/are preferably integral with the valve member, e.g. as a one-piece entity, for simplicity and economy. A poppet-type valve, having an enlarged head which can sit in the discharge opening to close it and a retaining shank which extends back into the passage to retain the valve, and which may additionally provide a resilient biasing action, is preferred. Desirably the valve head lies substantially flush with the pick-up surface in the closed position, so that the preferred wiping pick-up action is not interfered with.

OPTIONS AND PREFERENCES

The product container preferably includes a parallel-walled cylindrical portion to cooperate with a follower piston in use, to achieve an airless operation. The options for positioning the pick-up surface and pump actuator/pump offset from one another lend themselves to a distinctive appearance, for which it may be desired to provide a correspondingly contoured shape envelope for the (lower) container. In such a case the container may have an inner cylindrical part to hold the product, and an outer decorative shell portion, preferably formed in one piece with the inner part if these are of plastics material, with non-cylindrical walls meeting an outer wall of the dispenser body above to form an external decorative casing.

Regarding the overall size of the dispenser (including the container), preferably it fits into one hand as mentioned previously. Desirably the dispenser edge adjacent the actuator portion is free or unobstructed so that the thumb or a finger of a hand holding the dispenser can extend up around the edge to press the actuator portion. Maximum transverse dimension is desirably less than 100 mm, preferably less than 90 mm or 80 mm. Maximum height—especially where as preferred this corresponds to the height of the actuating portion for the dispenser (with any cover cap removed)—is preferably less than 70 mm and more preferably less than 60 mm. Thus, the transverse dimension is generally greater than the height, i.e. it is a squat dispenser.

Because the design is especially useful for small dispensers and high-value products, the preferred product volume in the container is below 100 ml, more preferably below 60 ml. Importantly, the "dose" corresponding to one actuation of the dispenser is usually small: preferably less than 2 ml and more preferably less than 1 ml. Naturally this will depend on the particular product.

Concerning dispenser pump chambers, an inlet valve is preferably a flap valve made as a moulded entity. A flap element overlies the inlet opening, and is held in position by one or plural limbs which are flexible so that the flap can rise under pressure to open the valve. Preferably there are plural limbs distributed around the flap, to give a centrosymmetric action, and with resilience to return the flap positively to the closed position. A preferred inlet valve is a one-piece moulding comprising an outer mounting ring, a circumferentially-distributed series of curved resilient connecting limbs, and a central circular closure plate or flap element.

Concerning an outlet valve, there is a choice. Where the product is thick and, as is usual, the outlet passageway is more restricted than the inlet passage, the pump chamber will often refill (prime) satisfactorily without any outlet valve. A certain amount of back-flow along the outlet passage during priming can be beneficial in this case, because such "suckback" clears product and avoids possible blockage by dried residues. With less viscous products, an outlet valve may be desirable to assure adequate priming of the chamber. For that purpose, a valve may be positioned anywhere between the pump chamber and the discharge opening. However as mentioned above, there is value in keeping air out of the outlet passage. For that purpose an outlet valve adjacent the discharge opening is preferred.

In any event, it is preferred to have a supplementary cover, such as an outer cap, to keep the dispenser exterior clean as well as for shipping security. It is preferred that the outer cover includes a closure projection which, with the cover in place, keeps the discharge opening shut. This may be by a tip of the projection blocking the discharge opening. Or, a tip of the projection may engage the top of a discharge valve to stop it from opening.

When a pump return spring is provided, especially when of metal, it is desirably outside the pump chamber to reduce contamination.

Figure 1B:
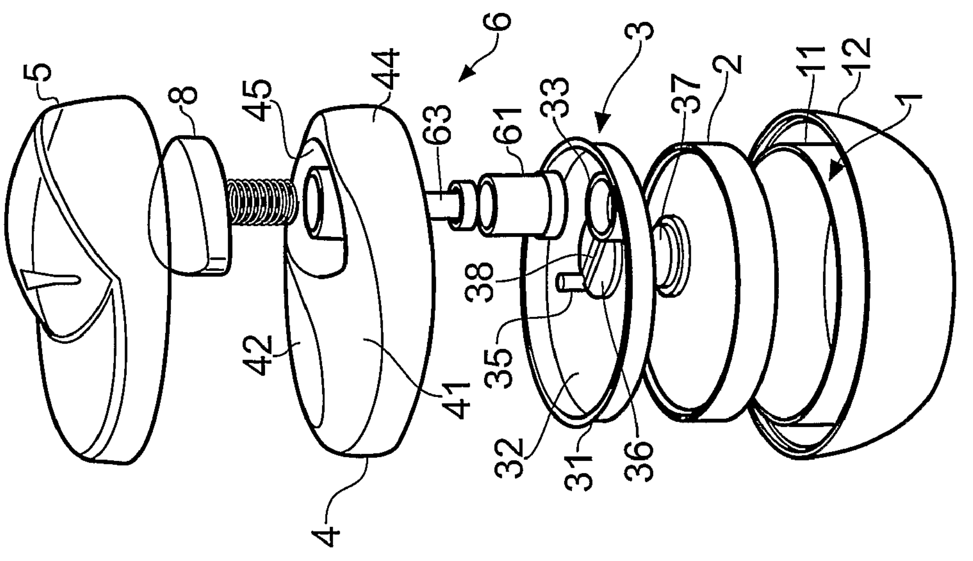
Figure 2A:
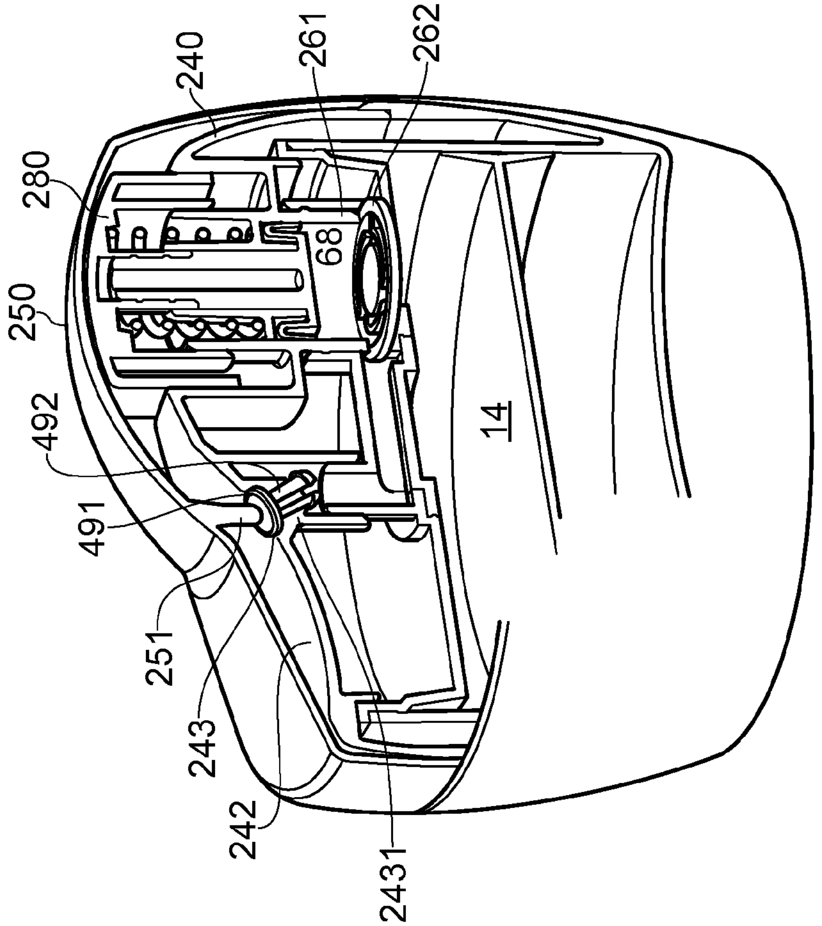
Figure 2B:
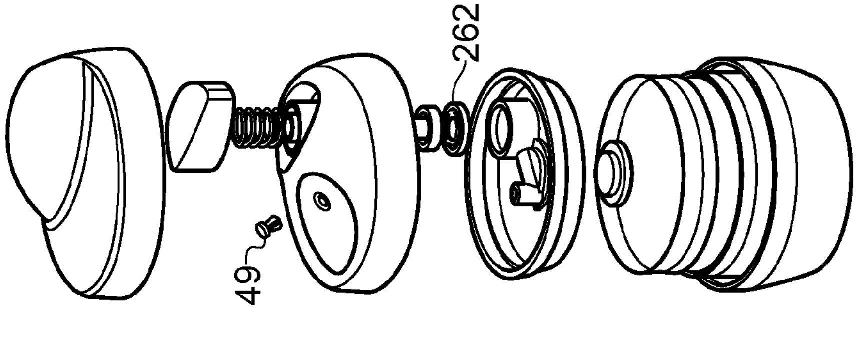
Figure 3A:
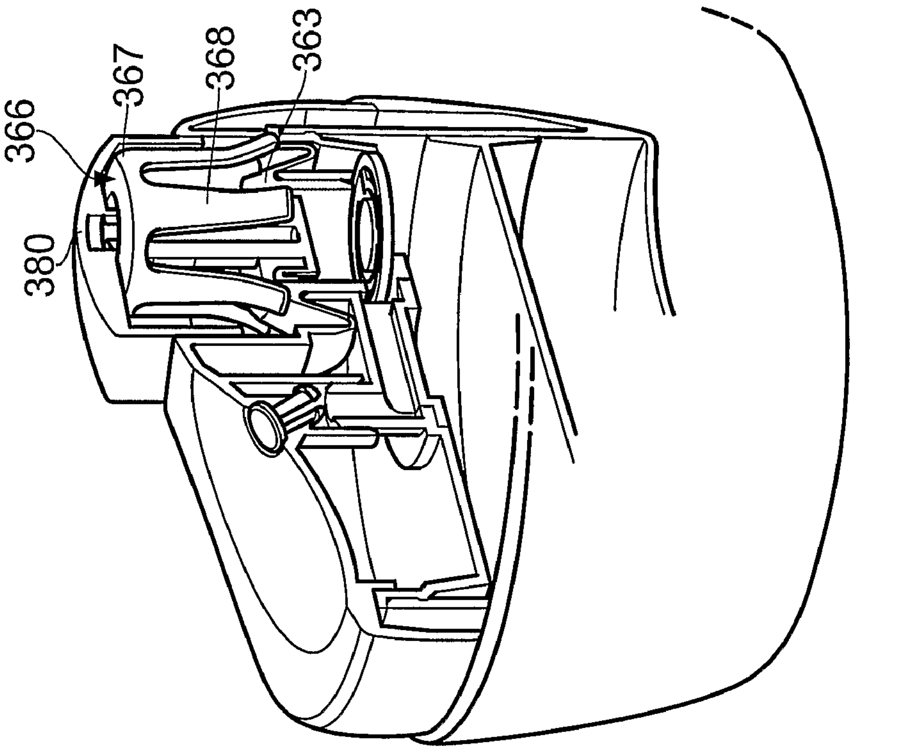
Figure 3B:
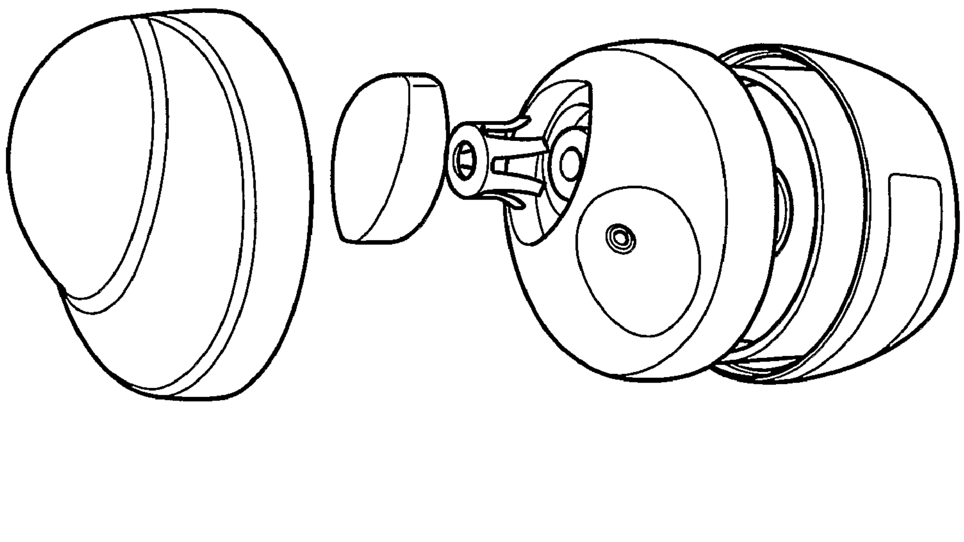
Figure 4A:
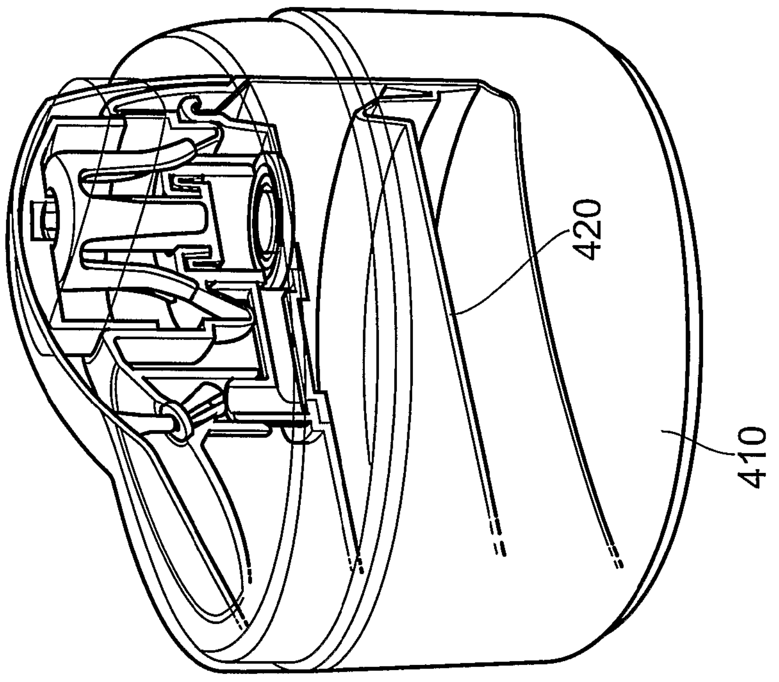
Figure 4B:
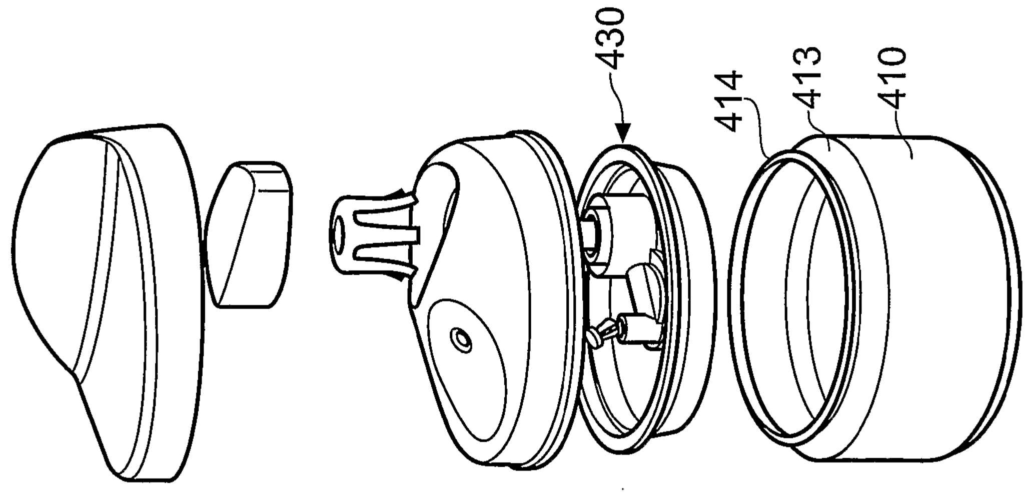
Figure 5A:
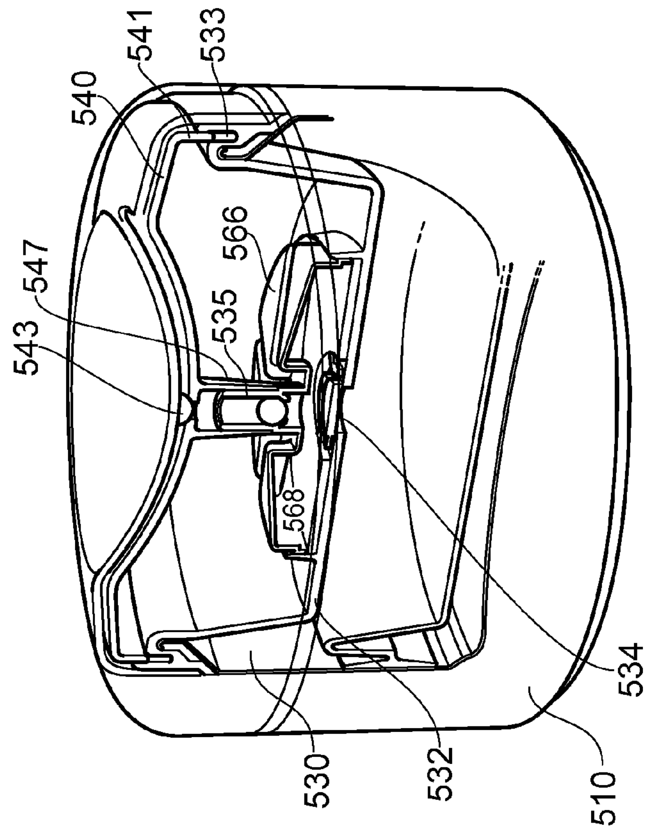
Figure 5B:
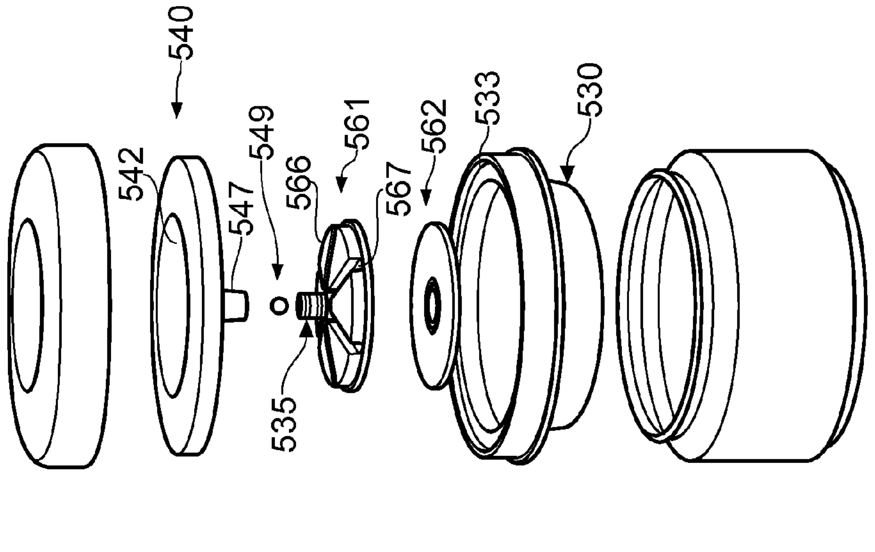
Figure 6A:
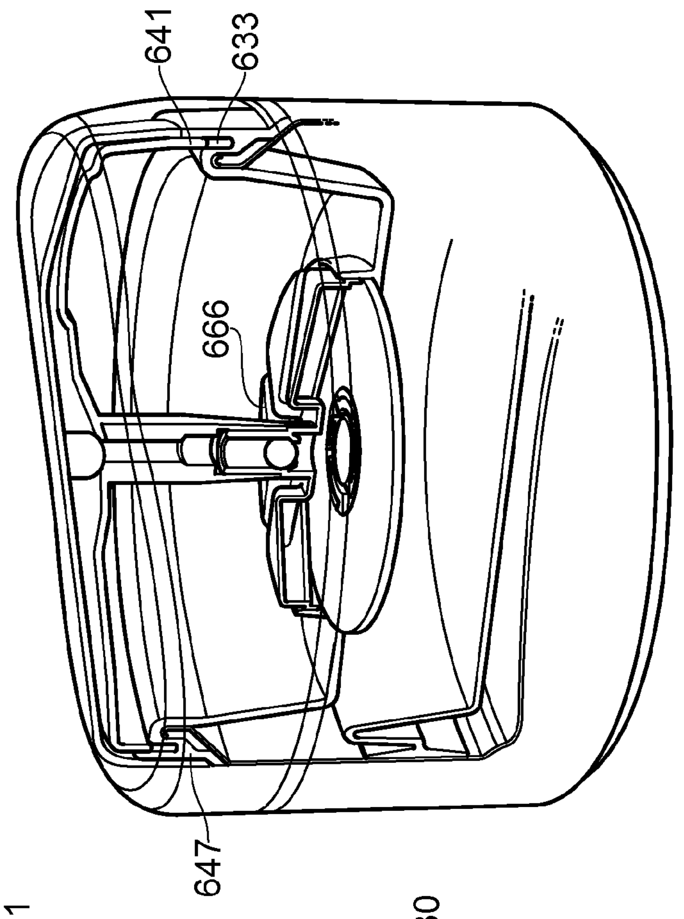
Figure 6B:
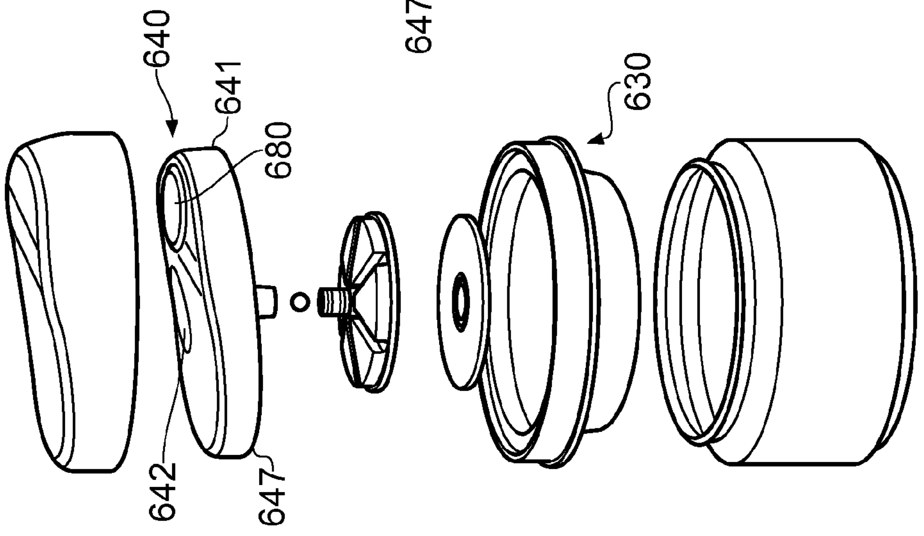
Figure 7E:
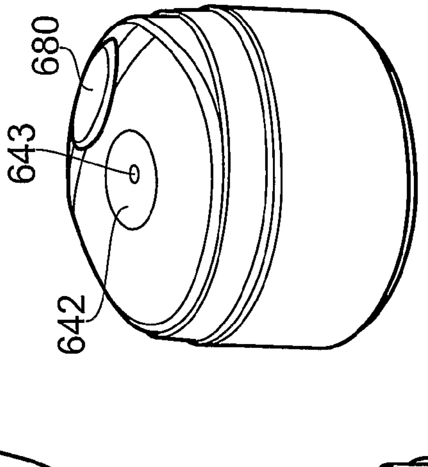
Figure 7B:
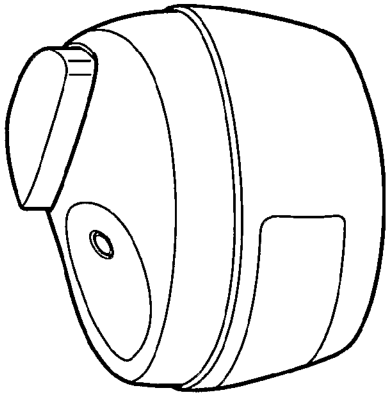
Figure 7D:
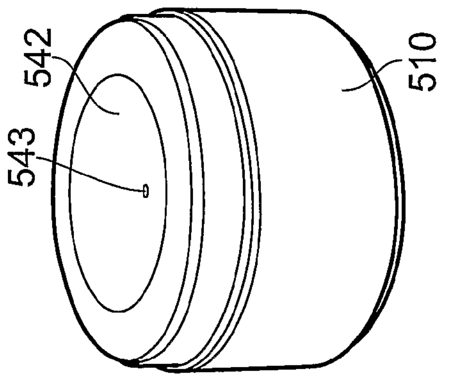
Figure 7A:
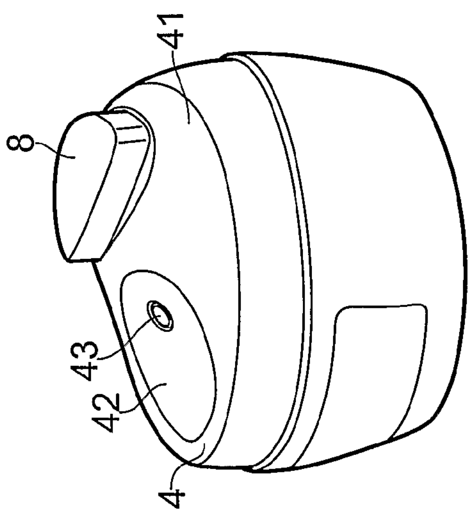
Figure 7C:
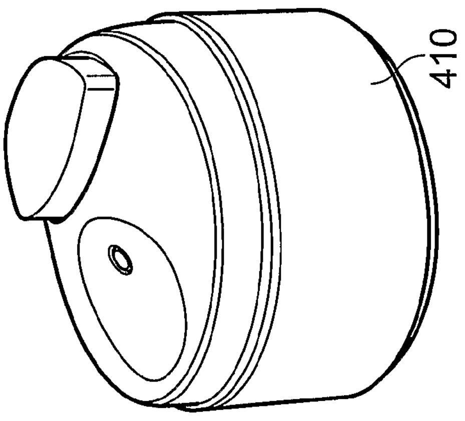

Having set out our proposals in general terms, embodiments are now described by way of example with reference to the following drawings, in which:

FIGS. 1(*a*) and 1(*b*) are respectively a radial cross-sectional view and an exploded view of a first embodiment;

FIGS. 2(*a*) and 2(*b*) are respectively a radial cross-sectional view and an exploded view of a second embodiment;

FIGS. 3(*a*) and 3(*b*) are respectively a radial cross-sectional view and an exploded view of a third embodiment;

FIGS. 4(*a*) and 4(*b*) are respectively a radial cross-sectional view and an exploded view of a fourth embodiment;

FIGS. 5(*a*) and 5(*b*) are respectively a radial cross-sectional view and an exploded view of a fifth embodiment;

FIGS. 6(*a*) and 6(*b*) are respectively a radial cross-sectional view and an exploded view of a sixth embodiment, and FIGS. 7(*a*) to (*e*) are oblique external views of the first, second and fourth to sixth embodiments.

Referring to FIG. 1 and FIG. 7(*a*), a first embodiment of dispenser is dimensioned to be held easily in one hand, having a generally circular plan of about 85 mm diameter and about 55 mm overall height. The main system components are a container 1, a follower piston 2, a dispenser bottom plate 3, a dispenser body top plate 4, a cover cap 5, and components constituting a pump 6 which are described later. All of these components (except a metal pump spring) are moulded in plastics. The container 1 has a cylindrical inner wall 11 defining a product reservoir space 14, and a decorative outer wall 12 formed in one piece with it. The follower piston 2 sits inside the container 1, with its seal 21 engaging around the inner container wall 11 and a lower support annulus 22 resting on the container floor initially. The container base has a vent hole 13 so that the follower piston 2 can rise freely.

The lower dispenser plate (or lower body component) 3 has a peripheral upstanding wall 31 so that it plugs sealingly into the container wall 11. It consists generally of a closed web or wall 32, defining the top of the product reservoir 14, and conduit structure defining parts of the pump and outlet system. This latter includes an inlet opening 34 for the pump, a tubular outlet chimney 35, a cylindrical seat formation 33 for a discrete pump cylinder 61, and the roof 38 of a transverse outlet conduit 69 communicating between the cylinder seat 33 (which has an outlet hole) and the outlet chimney or riser 35. The roof 38 of the transverse conduit is formed as a channel traversing a circular depression 36 moulded into the underside of the wall 32. A circular cover component 37 fits flush into this depression, without the need for rotational alignment, closing the open channel side to form a closed conduit 69.

A cylinder component 61 defining a pump chamber 68 sits on the bottom plate 3 in the seat 33 above the inlet opening 34. An inlet valve 62 is here, moulded in this embodiment in one piece with the cylinder wall.

The dispenser's top body cover 4 is generally circular in plan, and its surround wall or skirt 44 marries smoothly with the decorative wall 12 of the container 1. As shown, it is a generally stiff or rigid moulded component like the container 1 beneath. It presents a generally closed and upwardly convex contoured upper surface featuring a concave dished pick-up area 42, a generally convex contoured surround region 41 and a seating 45 receiving a push button 8 for actuating the pump. As seen in FIG. 7(*a*), the concave pick-up area meets the surround surface at an angled edge, and occupies less than a quarter of the plan area of the total top surface (i.e. the area up to the edge formed with the downward skirt 44). The top plate has the seating 45 and the button 8 projecting up as an eminence at one side (the right-hand side as shown), with a downward slope at the other side including the pick-up area 42, which is itself generally downwardly sloping. A discharge opening 43 opens in the pick-up area on its upward slope, i.e. towards the dispenser button 8.

Referring particularly to FIG. 1, beneath the discharge opening 43 the top plate has a downward chimney 47 which couples with the outlet chimney 35 of the lower plate, completing the outlet passage. The top plate has a re-entrant cylindrical formation 64 inside the seating 45 which plugs into the top of the cylinder 61 and also provides a tubular guide for a plunger stem 63 fixed into the base of the button 8. The return spring 66 is trapped between the button and the guide in a conventional way, outside the pump chamber. The entire pump engine (plunger, piston, cylinder) is positioned transversely offset from the pick-up area, and the outlet is brought to the pick-up area by means of the transverse feed passage 69 described previously.

In use, the dispenser can be held in one hand and the button 8 pushed with the thumb or finger of the same hand. This dispenses a dose of product (0.5 ml in this particular example) from the discharge opening 43 onto the pick-up area 42 where it can be picked up with a fingertip as desired.

The cover cap 5 has a central downward peg 51 whose end plugs into the discharge outlet 43 when the cover cap is fitted, as shown in FIG. 1(*a*). This prevents leakage of product during shipping.

FIG. 2 and FIG. 7(*b*) show a second embodiment in most respects the same as the first. One difference is that a poppet valve 49 is provided as an outlet valve in the discharge opening 243. This valve has a head constituting a closure disc 491 which lies generally flush with the pick-up surface 242 in the closed position, and a set of spaced legs 492 with downwardly-divergent outer surfaces, acting against the tubular retaining surround 2431 of the top plate. These divergent legs, resiliently outwardly biased, urge the valve to its closed position by a sliding cam action. For shipping, a central downward peg 251 of the cover cap 250 engages the valve head 491 and holds it shut. In use, particularly with less viscous products, the poppet valve blocks the outlet during return of the pump plunger, ensuring good fill of the pump chamber 68. It also keeps dirt out.

A further difference is that the inlet valve 262 is formed as a component separate from the pump cylinder 261, having its own discrete mounting ring. Instead of being a discrete component, the pump cylinder 261 is formed as part of the re-entrant formation of the top plate 240 surrounding the plunger button 280.

Finally, this second embodiment shows a more compact construction than the first, with the product chamber 14 being higher in relation to its diameter so that the diameter is less for the same product capacity (50 ml in this example). The pot fits comfortably into one hand.

The characteristic inclined disposition of the pick-up area 242 with the higher plunger button 280 on the top of the dispenser is generally similar to that in the first embodiment.

FIG. 3 shows a third embodiment the same as the second as regards external contour (i.e. as in FIG. 7(*b*)), but using a different kind of pump spring to avoid a metal component. Instead, a plastics spring component 366 is used, having a set of resilient limbs 368 projecting down from a top mounting plate 367 fitting around the plunger stem. The ends of these limbs ride onto a downwardly-divergent (conical) cam surface 363 around the bottom of the cylinder and are pre-tensioned, i.e. displaced outwardly against their resilience even in the uppermost (rest) condition of the button 380. When the button is depressed, the limbs 368 are forced further outwardly on the cam surface 363, providing an increasing restoring force to return the button positively to the top when it is released. For durability and restoring force, the spring component 366 should be of a durable and resilient plastics such as acetal.

In the fourth embodiment shown in FIG. 4 and FIG. 7(*c*), the pump engine and the outer and inner top plate are generally as in the third embodiment. However there is a radical change in that an aluminium container 410 is used. Metal containers have better barrier properties, particularly for volatiles such as perfume components, than simple plastics containers. They also allow further scope for the kind of exterior decoration to be applied. In this embodiment, the container or can 410 is formed by impact extrusion, and the top edge is crimped in to form a convergence 413 and edge lip 414. The dispenser's lower body plate 430 plugs down into this, as before. Because a follower piston 420 is used, this must be positioned in the can 410 before the top edge is crimped in.

The embodiment shown in FIG. 5 and FIG. 7(*d*) takes a different approach, although the use of a metal container 510 as seen in the fourth embodiment is maintained. In this dispenser, the top plate 540 takes a conventional centrosymmetric form, with a large circular central dished pick-up zone 542. The lower plate 530 sits down plug-fashion inside the container rim as before, but the pump chamber inlet 534 is central. A distinctive feature here is that instead of a piston and cylinder, the pump chamber 568 is delimited from above by a resiliently deformable pump chamber wall component 561, with a central outlet spigot 535 connecting axially directly up to the central discharge opening 543, connected via a downward socket 547 of the top plate. An outlet ball valve 549 is used in this embodiment.

The deformable pump chamber wall component 561 is generally circular in plan and has an outer retaining wall which is axially short, snapping into the underlying plate 532. Unlike a bellows wall (which would be axially long), deflection is provided in the top wall of the component. To provide adequate restoring force in this situation, using conventional moulded plastics rather than elastomer, this top wall is segmented into a plurality of generally triangular facets 566 separated from one another and from the central spigot 535 by troughs 567. These troughs 567 reinforce the wall against bending, creating high resilience so that the pump will restore and prime its own chamber without a discrete return spring being needed. Because the stroke is short, the pump chamber 568 is made wide. The inlet valve element 562 is essentially the same as in previous embodiments.

An upper plate 540 has a circular top wall with a downwardly-dependent skirt 541 all around, which sits in a retaining groove 533 around the top of the underlying plate 532. The downward skirt 541 is free to move down, by the same distance all around, in a dispensing stroke of the entire upper plate 540, to deform the chamber wall 561 downwardly and dispense product.

The use of the resilient wall reduces the number of components in the pump. The ball-type valve is an option. A poppet valve could be used instead, e.g. as above. In this example, the substantial travel of the ball between its closed and fully open positions provides for a volume of product to be sucked back into the pump chamber before the valve closes. This helps to keep the outlet passage clear.

It is generally preferable for the pump chamber to be substantially cleared by each stroke. In the present proposal, this can be achieved if desired by making the floor of the pump chamber—provided in this case by the disc surrounding the inlet valve 562—generally complementary to the underside of the top wall.

Additionally or alternatively, the specially shaped resiliently deformable chamber wall 561 can be formed in one piece with the lower body plate 530 (because it can be made from conventional moulding plastics), providing the floor and inlet arrangement as a separate insert from beneath. This could reduce leakage by having a simpler joint.

An issue with a deformable wall of this kind is that its maximum resistance to deformation is at the beginning of the stroke. This might inhibit or surprise users.

FIG. 6 and FIG. 7(*e*) show a way of ameliorating this, which will be useful with other kinds of pump action, with or without a deformable wall as illustrated. Here, the top plate 640 returns to the inclined conformation of the earlier embodiments, with a push actuator or button portion 680 at an eminence to one side, with a downward slope from the button to the opposite side including the pick-up surface area 642 which itself is correspondingly inclined. However the pick-up area is central, as in the previous embodiment, although smaller, and with its discharge opening 643 in the centre, i.e. above the outlet of a central deformable pump chamber as in the fifth embodiment. As mentioned, another kind of pump, e.g. piston/cylinder could be used. The distinctive feature here is that, at the side of the top plate 640 opposite the actuator button formation 680 (which is not discrete but simply a fixed integral eminent portion shaped for engagement by a thumb or finger) the downward surround skirt 641 has a circumferentially located tooth 647 for hook engagement beneath a corresponding shoulder in the receiving groove 633 of the upstanding surround of the bottom dispenser component 630. An engagement recess or shoulder in which the tooth 647 engages pivotably can be created simply by a small cut-away. Because the actuator button portion 680 is nearly twice as far from this pivot point as the line of action down onto the pump chamber spring wall 666, a mechanical advantage of nearly 2:1 is available. With a deformable wall pump chamber this reduces unexpected sensation for the user. With other kinds of pump spring it would further reduce the effort required.

The invention claimed is:

1. Hand-operated dispenser suitable for flowable products, comprising a container with an internal reservoir to hold a body of the product, the container having a base and a top, and a dispenser mechanism at the top of the container;

the dispenser mechanism including:

a pump having a pump chamber with an inlet communicating with said internal reservoir and an outlet communicating with a discharge opening;

a dispenser body extending across the top of the container and comprising a rigid molded dispenser body top plate with an external upwardly-directed dished pick-up surface through which the discharge opening opens and a surround surface region;

an upwardly-directed actuator portion depressible in a pumping stroke against a return force to reduce the volume of the pump chamber and thereby displace a dose of product onto the pick-up surface via the discharge opening;

the actuator portion being laterally offset beside the pick-up surface; and wherein the dispenser body top plate is generally inclined downwardly, in the direction from the actuating portion to the pick-up surface, wherein the actuator portion stands higher relative to said container base than the pick-up surface, the pick-up surface is generally downwardly-inclined away from the actuator portion, and the surround surface region is also downwardly inclined towards the side of the top plate having the pick-up surface.

2. Hand-operated dispenser according to claim 1 in which the actuating portion and the pick-up surface are both off-centre, to opposite respective sides of the top plate.

3. Hand-operated dispenser according to claim 1 in which the overall transverse dimension is greater than the height.

4. Hand-operated dispenser according to claim 1 in which the maximum transverse dimension is less than 80 mm and the height, corresponding to the height of the actuating portion, is less than 60 mm.

5. Hand-operated dispenser according to claim 1 in which the pump chamber is laterally offset relative to the discharge opening, with a transverse outlet passage connecting an outlet of the pump chamber to the discharge opening.

6. Hand-operated dispenser according to claim 5 in which both the inlet and outlet of the pump chamber are at the bottom of the pump chamber.

7. Hand-operated dispenser according to claim 1 in which the container is adapted to reduce the volume of the internal reservoir as product is progressively dispensed, to avoid exposure of the product to air therein.

8. Hand-operated dispenser according to claim 1 in which an outlet valve is provided at the discharge opening.

9. Hand-operated dispenser according to claim 8 in which said outlet valve has a valve member with an enlarged head which, in the closed position of the valve, lies substantially flush with the pick-up surface.

10. Hand-operated dispenser according to claim 1 in which the actuator portion is a button or plunger, discrete from the dispenser body top plate and the dished pick-up surface.

11. Hand-operated dispenser according to claim 1 in which the dispenser body top plate is movable relative to the container in the dispensing stroke, and comprises the actuator portion.

12. Hand-operated dispenser according to claim 11 in which the dispenser body top plate is mounted tiltably.

13. Hand-operated dispenser according to claim 1 in which the dispenser body is of plastics material and the container is of plastics or of metal.

14. Hand-operated dispenser according to claim 1 in which the pump chamber has a resiliently deformable wall, which provides said return force for the actuator portion.

15. Hand-operated dispenser according to claim 1 in which return force for the actuator portion is provided by a discrete moulded plastics restoring spring.

16. Hand-operated dispenser suitable for flowable products, comprising a container with an internal reservoir to hold a body of the product, the container having a base and a top, and a dispenser mechanism at the top of the container;

the dispenser mechanism including:

a pump having a pump chamber with an inlet communicating with said internal reservoir and an outlet communicating with a discharge opening;

a dispenser body extending across the top of the container and comprising a rigid molded dispenser body top plate with an external upwardly-directed dished pick-up surface through which the discharge opening opens and a surround surface region;

an actuator portion depressible in a pumping stroke against a return force to reduce the volume of the pump chamber and thereby displace a dose of product onto the pick-up surface via the discharge opening;

in which dispenser said restoring force for the actuator portion is provided by a resiliently deformable wall of the pump chamber, being a moulded plastics component; and wherein the dispenser body top plate is generally inclined downwardly, in the direction from the actuating portion to the pick-up surface, wherein the actuator portion stands higher relative to said container base than the pick-up surface, the pick-up surface is generally downwardly-inclined away from the actuator portion, and the surround surface region is also downwardly inclined towards the side of the top plate having the pick-up surface.

17. Hand-operated dispenser suitable for flowable products, comprising a container with an internal reservoir to hold a body of the product, the container having a base and a top, and a dispenser mechanism at the top of the container;

the dispenser mechanism including:

a pump having a pump chamber with an inlet communicating with said internal reservoir and an outlet communicating with a discharge opening;

a dispenser body extending across the top of the container and comprising a rigid molded dispenser body top plate with an external upwardly-directed dished pick-up surface through which the discharge opening opens and a surround surface region;

an actuator portion depressible in a pumping stroke against a return force to reduce the volume of the pump chamber and thereby displace a dose of product onto the pick-up surface via the discharge opening;

in which the dispenser body is made of plastics material, while the product container is a metal container having a retaining neck or edge formation engaging the plastics dispenser body; and wherein the dispenser body top plate is generally inclined downwardly, in the direction from the actuating portion to the pick-up surface, wherein the actuator portion stands higher relative to said container base than the pick-up surface, the pick-up surface is generally downwardly-inclined away from the actuator portion, and the surround surface region is also downwardly inclined towards the side of the top plate having the pick-up surface.

18. Hand-operated dispenser suitable for flowable products, comprising a container with an internal reservoir to hold a body of the product, the container having a base and a top, and a dispenser mechanism at the top of the container;

the dispenser mechanism including:

a pump having a pump chamber with an inlet communicating with said internal reservoir and an outlet communicating with a discharge opening;

a dispenser body extending across the top of the container and comprising a rigid molded dispenser body top plate with an external upwardly-directed dished pick-up surface through which the discharge opening opens and a surround surface region;

an actuator portion depressible in a pumping stroke against a return force to reduce the volume of the pump chamber and thereby displace a dose of product onto the pick-up surface via the discharge opening;

in which an outlet valve is provided at or adjacent to the discharge opening; and wherein the dispenser body top plate is generally inclined downwardly, in the direction from the actuating portion to the pick-up surface, wherein the actuator portion stands higher relative to said container base than the pick-up surface, the pick-up surface is generally downwardly-inclined away from the actuator portion, and the surround surface region is also downwardly inclined towards the side of the top plate having the pick-up surface.

19. Hand-operated dispenser according to claim 18 in which the valve at the discharge opening has a head which sits in the discharge opening to close it in a closed position of the valve, and which in that closed position lies substantially flush with the pick-up surface.

* * * * *